US012591763B2

(12) United States Patent
Akimoto et al.

(10) Patent No.: US 12,591,763 B2
(45) Date of Patent: Mar. 31, 2026

(54) PROCESSING A QUERY USING AN ENTITY FEATURE VECTOR

(71) Applicant: NEC Corporation, Tokyo (JP)

(72) Inventors: Kosuke Akimoto, Tokyo (JP); Takuya Hiraoka, Tokyo (JP); Kunihiko Sadamasa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 582 days.

(21) Appl. No.: 18/027,299

(22) PCT Filed: Oct. 6, 2020

(86) PCT No.: PCT/JP2020/037881
§ 371 (c)(1),
(2) Date: Mar. 20, 2023

(87) PCT Pub. No.: WO2022/074737
PCT Pub. Date: Apr. 14, 2022

(65) Prior Publication Data
US 2024/0013028 A1      Jan. 11, 2024

(51) Int. Cl.
*G06N 3/042* (2023.01)
(52) U.S. Cl.
CPC ..................................... *G06N 3/042* (2023.01)

(58) Field of Classification Search
CPC ......... G06N 3/042; G06N 3/044; G06N 5/025
See application file for complete search history.

(56) References Cited

U.S. PATENT DOCUMENTS

| | | |
|---|---|---|
| 2020/0312300 A1 | 10/2020 | Yan et al. |
| 2025/0342195 A1* | 11/2025 | Sabharwal ............. G06Q 50/18 |

OTHER PUBLICATIONS

International Search Report for PCT Application No. PCT/JP2020/037881, mailed on Nov. 10, 2020.
Feng Yifan, et al., "Hypergraph Neural Networks", Proceedings of the AAAI Conference on Artificial Intelligence, vol. 33, 2019.

* cited by examiner

*Primary Examiner* — Asher D Kells
(74) *Attorney, Agent, or Firm* — Sughrue Mion, PLLC

(57) ABSTRACT

A processing device includes: an entity pre-processing means for receiving a set of atoms, the atom indicating a combination of a predicate and an associative array of entities that are arguments of the predicate, and calculating for each of the entities an entity feature vector for each of the entities, the vector reflecting a correspondence between keys and the entity in the associative array; and a post-processing means for receiving a query indicating contents of processing, and executing the processing indicated by the query using the entity feature vector.

12 Claims, 11 Drawing Sheets

Fig. 5     ENTITY FEATURE VECTOR

PROCESSING A QUERY USING AN ENTITY FEATURE VECTOR

This application is a National Stage Entry of PCT/JP2020/037881 filed on Oct. 6, 2020, the contents of all of which are incorporated herein by reference, in their entirety.

TECHNICAL FIELD

The present invention relates to a processing device, a processing method, and a non-transitory computer readable medium storing a program.

BACKGROUND ART

When reasoning based on machine learning or logical inference, facts that are established between entities such as people or objects in the real world can be represented using predicates. Predicates define the nature of the facts of interest. A fact established in the real world is represented by an atom, which is the combination of a predicate corresponding to the nature of the fact and a set of entities associated with the fact.

In an actual application of machine learning, a set of atoms is received as input, and there is a case where it is desired to perform processing specific to a given atom or to perform processing specific to a given entity.

For example, the technique disclosed in Non Patent Literature 1 receives as input an atom set that represents facts established in the real world. However, the order among entities is not considered in the set of entities included in the atoms of the atom set. Then, predetermined calculation is executed using the atom set as input, and an entity feature vector summarizing the information in the atom set is calculated for each of the entities that appear in the atom set. Then, the entity feature vector is used to execute entity-specific processing, such as classification of the category to which the entity belongs.

CITATION LIST

Non Patent Literature

Non Patent Literature 1: Feng, Yifan, et al. "Hypergraph neural networks." Proceedings of the AAAI Conference on Artificial Intelligence. Vol. 33. 2019.

SUMMARY OF INVENTION

Technical Problem

However, the technique disclosed in Non Patent Literature 1 does not define the order among entities that are arguments in the set of atoms to be input, and thus cannot perform processing that take into account the different roles of entities when an atom set including predicates in which the entities in the arguments each have different roles is input.

The present disclosure has been made to solve such a problem, and an object of the present disclosure is to provide a processing device, a processing method, and a non-transitory computer readable medium storing a program, which can execute processing on a set of input atoms, taking into account the roles of entities in the arguments of the atoms, which may differ from each other.

Solution to Problem

A processing device according to the present disclosure includes: an entity pre-processing unit that receives as input a set of atoms, which is a combination of a predicate and an associative array of entities that are arguments of the predicate, and calculates for each of the entities an entity feature vector that reflects information according to the correspondence between keys in the associative array of the atoms and the entities; and a post-processing unit that receives a query indicating contents of processing to execute the processing indicated by the query using the entity feature vector.

A processing method according to the present disclosure includes: (a) receiving as input a set of atoms, which is a combination of a predicate and an associative array of entities that are arguments of the predicate, and calculating for each of the entities an entity feature vector that reflects a correspondence between keys and the entities in the associative array; and (b) receiving a query indicating contents of processing and executing processing indicated by the query using the entity feature vector.

A program according to the present disclosure causes a computer to execute: (a) receiving as input a set of atoms, which is a combination of a predicate and an associative array of entities that are arguments of the predicate, and calculate for each of the entities an entity feature vector that reflects a correspondence between keys and the entities in the associative array; and (b) receiving a query indicating contents of processing, and execute processing indicated by the query using the entity feature vector.

Advantageous Effects of Invention

The present disclosure provides a processing device, a processing method, and a non-transitory computer readable medium storing a program capable of realizing processing that reflects the roles of the entities in the arguments of atoms, which may differ from each other.

EXAMPLE EMBODIMENT (Premise)

Figure 1:
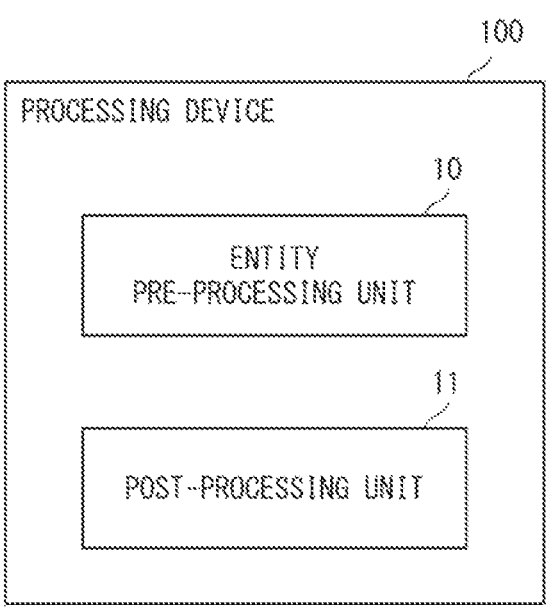
FIG. 1 is a block diagram illustrating the configuration of a processing device according to a first example embodiment.

First, "associative array" in this description refers to an array that stores data such as numerical values and character strings, and a data format in which keys such as numerical values and character strings are associated with elements in the array. An ordinary array can be regarded as an associative array by treating the position of an element in the array as the key of that element.

In the present description, an "entity" is an object, thing, person, concept, number, or the like that appears in an event and is given a distinguishable name. Examples of the entity include "Obama", "U.S." (proper nouns), and "Human" (nouns that describe concepts or types). An entity may also have an "attribute" in addition to a distinguishable name. An attribute is expressed in a form that can be summarized into a vector through pre-processing, such as a symbol, string, number, vector, or matrix, and represents a nature that an entity has. For example, the entity "Obama" can have as an attribute the number 185.4 cm, which represents height. Even when an entity does not have an attribute, it can be treated as having an attribute expressed by a symbol "no attribute".

A "predicate" also defines a fact or relationship between entities by the meaning or nature of that fact or relationship. A predicate may be a symbol, string, number, vector, matrix, or any other form that can express the meaning or nature of facts or relations between entities and can be summarized into a vector through pre-processing. For example, "isIn, $\{X, Y\}$" means "Y belongs to X" and is a predicate defining the relationship between entities X and Y.

Next, an "atom" is defined as a combination of a predicate and an associative array of entities that are arguments of the predicate, and represents that the fact or relationship defined by the predicate is established between the entities in the associative array. Here, the key associated with each entity in the associative array represents its role in the fact or relationship defined by the predicate of the entity. A key may be a symbol, string, number, vector, matrix, or any other format that can represent the role of the entity and can be summarized into a vector through pre-processing. In the present description, the key of the associative array of entities that are the arguments of a predicate is also referred to as the argument key of that predicate. For example, "<isIn, {area: Asia, country: Japan}>" means "Japan belongs to Asia" and is an atom that explains the relationship established between the entities "Asia" and "Japan" using the predicate "isIn". Here, "area" is the key for the entity "Asia". The "country" is the key for the entity "Japan".

Next, a "query" represents an indication input regarding the processing to be executed by the processing device and the output of the processing device. The query may include information about the entities associated with the execution of the processing in order to identify the content of the processing. The output of the processing device, as indicated by the query, can be in any format that can be obtained from a vector or number with prescribed post-processing, such as a symbol, string, number, vector, or matrix. For example, <classification, {entity: Tokyo, class:[city, person, country]}> is an example of a query for executing processing of classifying the category to which an entity belongs. The "classification" is a label indicating that the processing of classifying the category to which the entity belongs is to be executed. The {entity: Tokyo, class:[city, person, country]} is an associative array that stores auxiliary information necessary for processing. In this associative array, Tokyo, which is the value corresponding to entity, is the entity to be classified, and the array [city, person, country], which is the value corresponding to class, is an array that stores city, person, and country, which are candidates for three categories to which the entity can belong.

First Example Embodiment

The following is a description of the processing device, processing method, and program according to the first example embodiment, with reference to FIGS. 1 to 8.

[Device Configuration]

First, the configuration of the processing device according to the present first example embodiment will be described with reference to FIG. 1. FIG. 1 is a block diagram illustrating the configuration of the processing device according to the first example embodiment.

A processing device 100 according to the present first example embodiment illustrated in FIG. 1 receives an atom set and a query as input and outputs the result of the processing indicated by the query using the information included in the atom set. As illustrated in FIG. 1, the processing device 100 includes an entity pre-processing unit 10 and a post-processing unit 11. The entity pre-processing unit 10 and the post-processing unit 11 function as an entity pre-processing means and a post-processing means, respectively.

The entity pre-processing unit 10 receives as input a set of atoms, which is the combination of a predicate and an associative array of entities that are arguments of the predicate, and calculates for each of the entities an entity feature vector that reflects the correspondence between keys and entities in the associative array. For example, the entity pre-processing unit 10 receives a set of atoms as input and outputs an entity feature vector for each of the entities that reflects information according to the correspondence between keys and entities in the associative array of atoms, without updating any parameters.

The post-processing unit 11 receives a query indicating the content of processing and executes the processing indicated by the query using the entity feature vector. For example, the post-processing unit 11 receives an entity feature vector and a query as inputs, executes the processing indicated by the query using the information included in the entity feature vector, and outputs the result of the processing.

As described above, in the present example embodiment, the entity pre processing unit 10 outputs an entity feature vector reflecting information according to the correspondence between each key and entity in the associative array of entities that are arguments of the atoms in the input atom set. Therefore, even when the entities in the arguments of an atom have different roles, by distinguishing such roles as keys in the associative array, the post-processing unit 11 can realize processing specific to each of the entities that reflects the different roles of the entities in the atom.

Furthermore, since the entity pre-processing unit 10 does not update parameters to calculate entity feature vectors, even when different atom sets are input, the same parameters can be used in the entity pre-processing unit 10 to calculate consistent entity feature vectors for each atom set. As a result, the post-processing unit 11 can also execute consistent processing for atom sets including different entities by using entity feature vectors.

Figure 2:
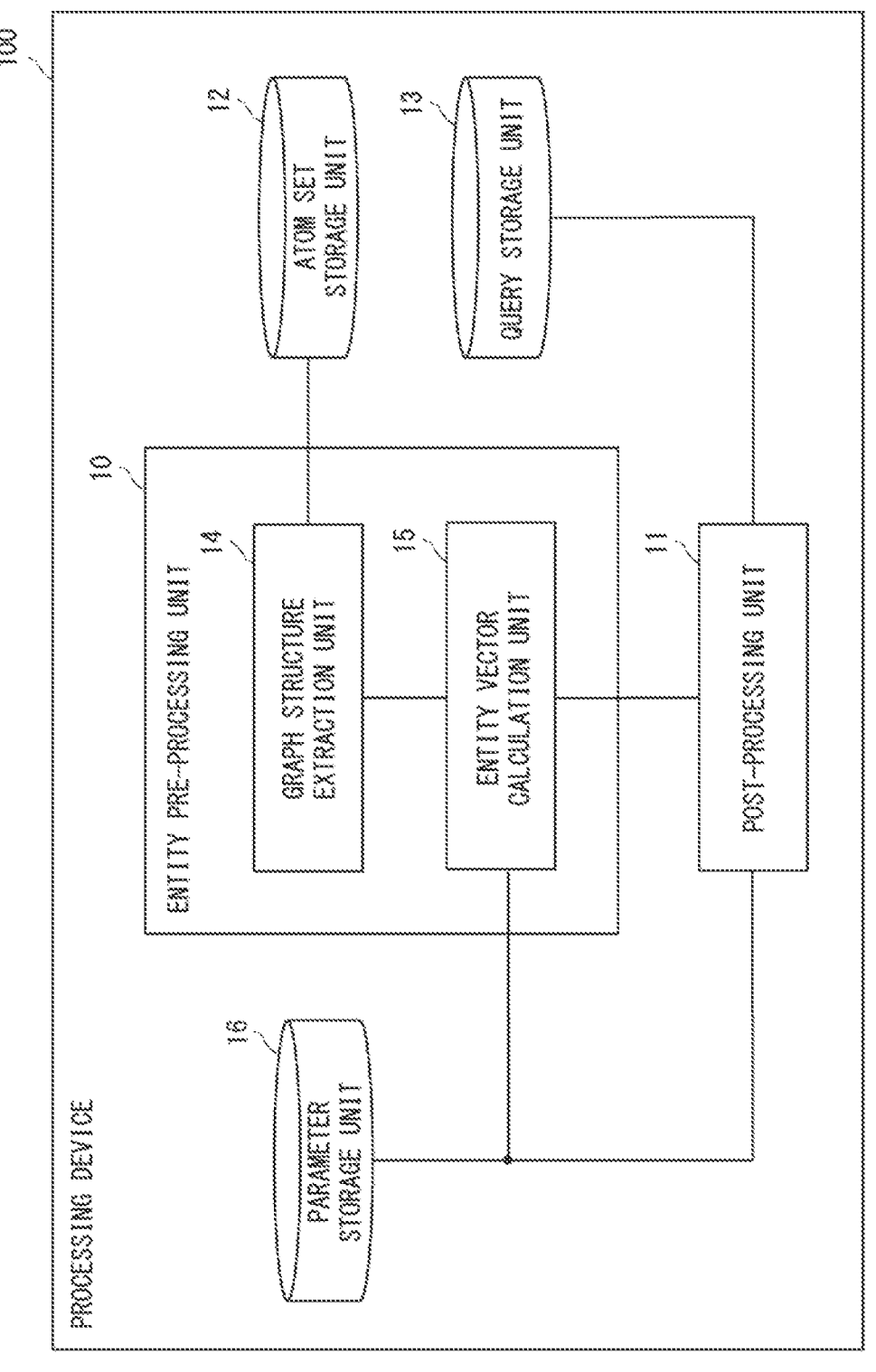
FIG. 2 is a block diagram that more specifically illustrates the configuration of the processing device according to the first example embodiment.

Next, the configuration and functions of the processing device 100 according to the first example embodiment are described more specifically using FIGS. 2 to 8. FIG. 2 is a block diagram that more specifically illustrates the configuration of the processing device according to the first example embodiment.

As illustrated in FIG. 2, in the present example embodiment, the processing device 100 further includes an atom set storage unit 12, a query storage unit 13, and a parameter storage unit 16. The atom set storage unit 12, query storage unit 13, and parameter storage unit 16 function as an atom set storage means, a query storage means, and a parameter storage means, respectively. The entity pre-processing unit 10 includes a graph structure extraction unit 14 and an entity vector calculation unit 15 inside. The graph structure extraction unit 14 and entity vector calculation unit 15 function as a graph structure extraction means and entity vector calculation means, respectively. The parameter storage unit 16 stores the parameters used by the entity vector calculation unit 15 and the parameters used by the post-processing unit 11.

Figure 3:
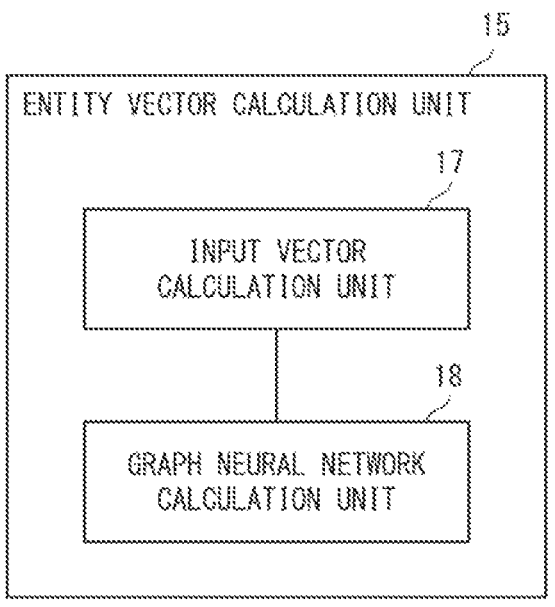
FIG. 3 is a block diagram that more specifically illustrates the configuration of an entity vector calculation unit according to the first example embodiment.

FIG. 3 is a block diagram that more specifically illustrates the configuration of the entity vector calculation unit according to the first example embodiment. As illustrated in FIG. 3, in the present example embodiment, the entity vector calculation unit 15 includes an input vector calculation unit 17 and a graph neural network calculation unit 18. The input vector calculation unit 17 and graph neural network calculation unit 18 function as input vector calculation means and a graph neural network calculation means, respectively.

In the present example embodiment, the graph structure extraction unit 14 receives a set of atoms as input and constructs a graph structure including information on the correspondence between keys and entities in the associative array. Specifically, the graph structure extraction unit 14 extracts a graph structure from the atom set retrieved from the atom set storage unit 12. The graph structure includes a node corresponding to all or some of the entities included in the atom set. The graph structure also includes nodes corresponding to all or some of the atoms in the atom set. In addition, the graph structure includes, for all or some of the combinations of atoms in the atom set and entities in the arguments of the atoms, labeled edges between nodes corresponding to the atoms and nodes corresponding to the entities, with labels corresponding to combinations of predicates corresponding to the atoms and argument keys of the associative array corresponding to the entities in the atoms.

Figure 4:
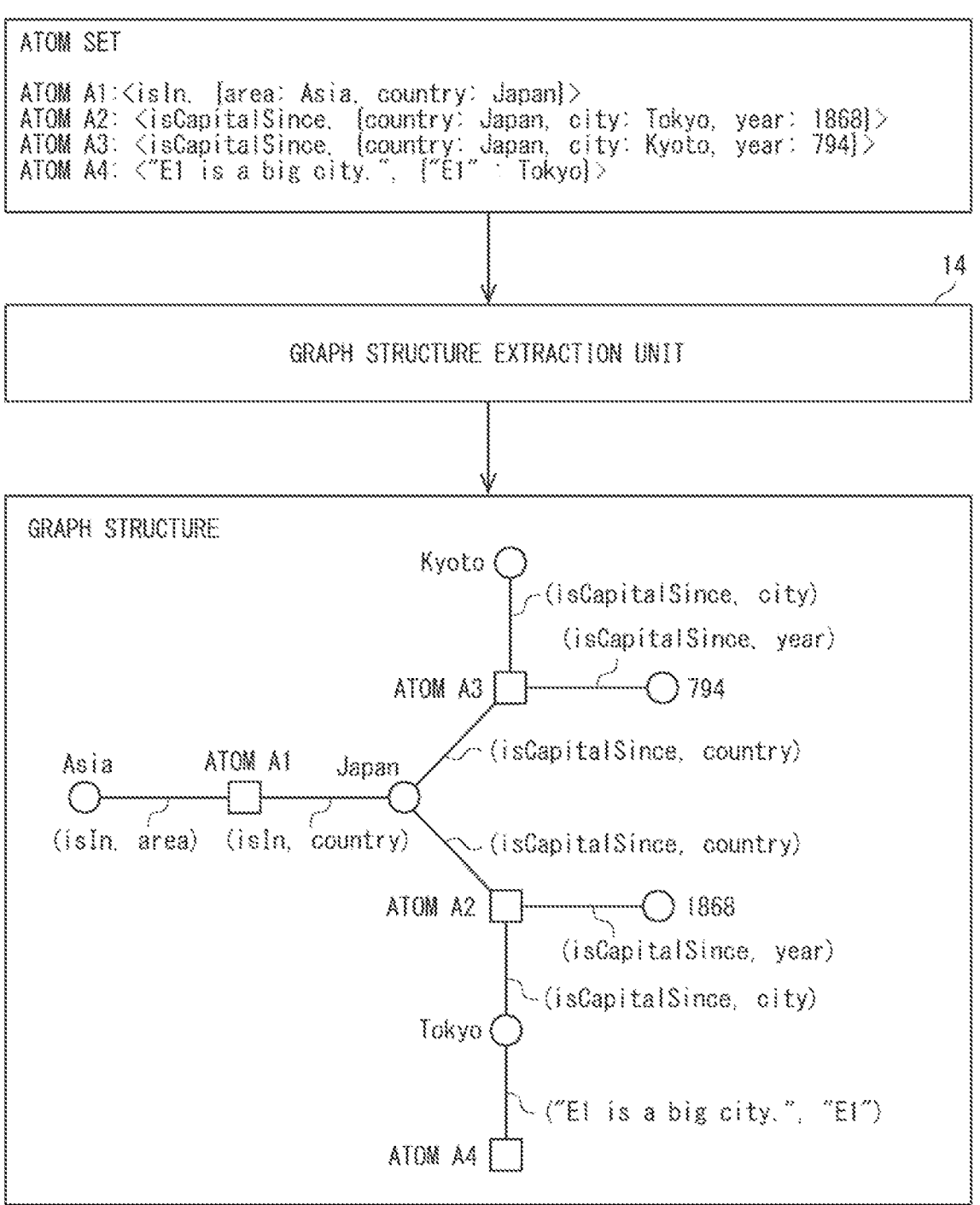
FIG. 4 is a diagram illustrating an example of a graph structure extraction unit according to the first example embodiment.

FIG. 4 is a diagram illustrating an example of the graph structure extraction unit 14 according to the first example embodiment. Note that the unidirectional arrows and graph structure in the figure simply show the relationships among the data, and do not exclude bidirectional relationships among the data, nor do they assume a data structure based on any particular graph structure. In the example in FIG. 4, four atoms, atom A1: <isIn, {area: Asia, country: Japan}>, atom A2: <isCapitalSince, {country: Japan, city: Tokyo, year: 1868}>, atom A3: <isCapitalSince, {country: Japan, city: Kyoto, year: 794}>, and atom A4: <"E1 is a big city.", {"E1": Tokyo}> are retrieved from the atom set storage unit 12. Then, the graph structure extraction unit 14 outputs a graph structure that includes nodes corresponding to Asia, Japan, Tokyo, and Kyoto, and nodes corresponding to each of the four atoms, and the following labeled edges.

Atom A1—Asia (label:(isIn, area))
Atom A1—Japan (label:(isIn, country))
Atom A2—Japan (label:(isCapitalSince, country))
Atom A2—Tokyo (label:(isCapitalSince, city))

Atom A2—1868 (label:(isCapitalSince, year))
Atom A3—Japan (label:(isCapitalSince, country))
Atom A3—Kyoto (label:(isCapitalSince, city))
Atom A3—794 (label:(isCapitalSince, year))
Atom A4—Tokyo (label:("E1 is a big city", "E1"))

The entity vector calculation unit 15 receives the graph structure and calculates the entity feature vector for each entity. Specifically, in the present example embodiment, the entity vector calculation unit 15 uses the graph structure output from the graph structure extraction unit 14 and the parameters stored in the parameter storage unit 16, and outputs an entity feature vector for each entity that has a corresponding node in the graph structure, the vector including information about the correspondence between the argument keys and entities in the associative array in the atom set of that entity.

Therefore, in the present example embodiment, the entity vector calculation unit 15 inputs the graph structure to the input vector calculation unit 17, which calculates the input vector corresponding to each node in the graph structure and each edge. The input vectors corresponding to each node and each edge are then input to the graph neural network calculation unit 18, which calculates the graph neural network output vector corresponding to each node. At this time, additional graph structures may be input to the graph neural network calculation unit 18. Subsequently, the entity vector calculation unit 15 identifies the node corresponding to the entity in the graph structure and outputs the graph neural network output vector corresponding to that node as the entity feature vector corresponding to the entity.

The case where some or all of the input vectors corresponding to each node and to each edge are not calculated is also included in the present example embodiment, because a special vector indicating that such vectors are not calculated can be used instead. The calculation by the input vector calculation unit 17 and the calculation by the graph neural network calculation unit 18 may use the parameters stored in the parameter storage unit 16.

Figure 5:
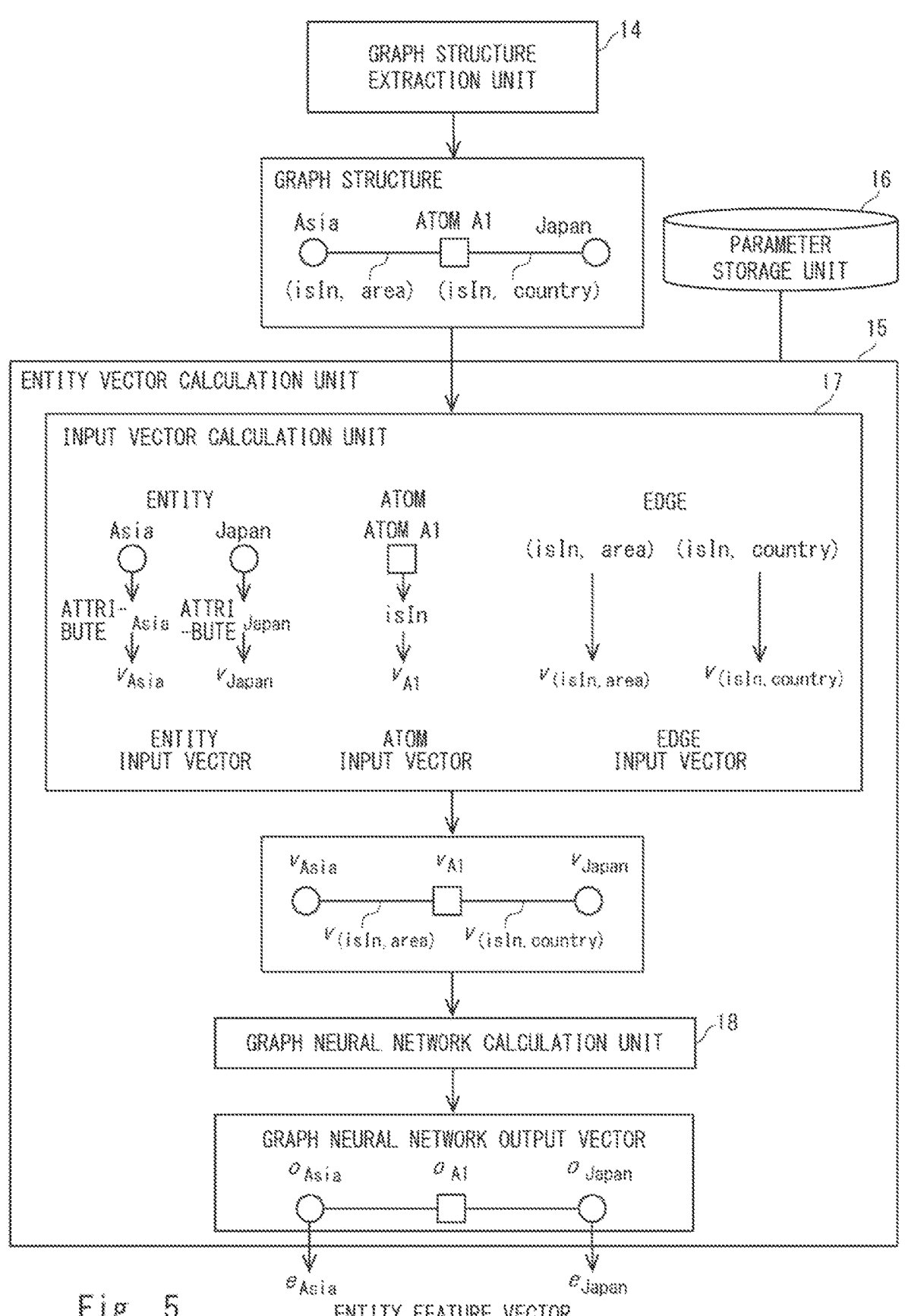
FIG. 5 is a diagram illustrating an example of the operation of the entity vector calculation unit according to the first example embodiment.

FIG. 5 is a diagram illustrating an example of the operation of the entity vector calculation unit 15 according to the present example embodiment. Note that the unidirectional arrows and graph structure in the figure simply show the relationships among the data, and do not exclude bidirectional relationships among the data, nor do they assume a data structure based on any particular graph structure.

In the example in FIG. 5, the entity vector calculation unit 15 receives the graph structure output by the graph structure extraction unit 14 as input. The graph structure includes nodes corresponding to the entities Asia and Japan, a node corresponding to the atom A1: <isIn, {area: Asia, country: Japan}>, the following labeled edges: Edge 1 and Edge 2.

Edge 1: Atom A1—Asia (label:(isIn, area))
Edge 2: Atom A1—Japan (label:(isIn, country))

Subsequently, the entity vector calculation unit 15 inputs the graph structure to the input vector calculation unit 17.

In the example in FIG. 5, for Asia and Japan, which are entities in the graph structure, the input vector calculation unit 17 retrieves $attribute_{Asia}$ and $attribute_{Japan}$, which are attributes of the entities, and calculates $v_{Asia}$ and $v_{Japan}$ as the entity input vectors corresponding to Asia and Japan from the attributes. Entity input vectors are calculated, for example, by pre-processing the attributes to convert them to vector form, executing operations on the vectors, or matrix operations, or using neural networks, or a combination of calculations.

Subsequently, the input vector calculation unit 17 calculates $v_{A1}$ as the atom input vector for atom A1, which is an atom in the graph structure. In the example in FIG. 5, the atom input vector is calculated by pre-processing isIn, which is the predicate corresponding to the atom, to convert it to vector form, and then executing operations on the vector, matrix operations, or calculations using a neural network, or a combination thereof. The atom input vector may be calculated by the calculation of the present example embodiment, or, for example, a vector stored in the parameter storage unit 16 as is.

Subsequently, the input vector calculation unit 17 calculates $v_{(isIn,area)}$ and $v_{(isIn,country)}$ as edge input vectors for Edge 1 and Edge 2, which are edges in the graph structure. In the example of the calculation of the edge input vector in FIG. 5, the labels (isIn, area) and (isIn, country) are retrieved. Then, isIn, which is the predicate that constitutes the label, and some or all of the argument keys, area and country, are pre-processed and converted to vector form. Furthermore, the input vector calculation unit 17 is realized by operations on vectors, or matrix operations, or calculations using neural networks, or a combination of calculations.

Then, in the example in FIG. 5, the entity vector calculation unit 15 assigns the entity input vector, atom input vector, and edge input vector to the corresponding entity, atom, and entity as input vectors, and inputs them to the graph neural network calculation unit 18.

Subsequently, the graph neural network calculation unit 18 calculates the graph neural network output vectors $o_{Asia}$, $o_{A1}$, and $o_{Japan}$ from the input vectors described above using a graph neural network.

Then, the entity vector calculation unit 15 outputs the graph neural network output vectors, $o_{Asia}$ and $o_{Japan}$, for Asia and Japan, which are entities in the graph structure, as entity feature vectors $e_{Asia}$ and $e_{Japan}$.

In the present example embodiment, the post-processing unit 11 first reads the query from the query storage unit 13 and identifies the content of the processing indicated by the query.

Subsequently, for all or some of the entities related to the processing of the query, the post-processing unit 11 retrieves the entity feature vectors for those entities, which are calculated by the entity vector calculation unit 15. Then, the post-processing unit 11 executes calculation using the retrieved entity feature vectors as input, according to the processing indicated by the query. The calculation is realized by, for example, operations on vectors, matrix operations, neural networks, or a combination of operations and processing. Subsequently, the post-processing unit 11 retrieves the vectors that are the result of the calculation and outputs the result of the predetermined post-processing on the vectors.

Figure 6:
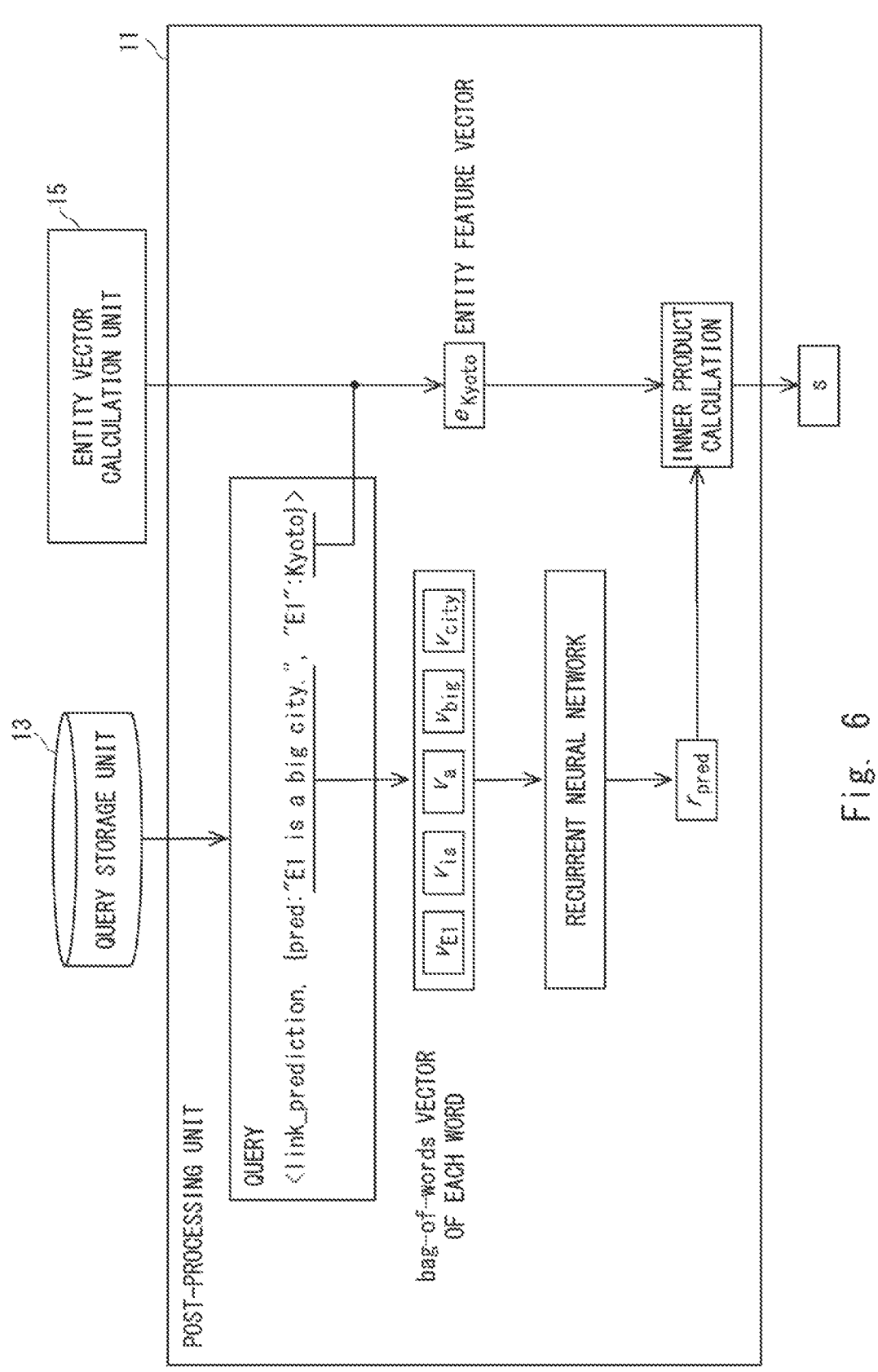
FIG. 6 is a diagram illustrating an example of the operation of a post-processing unit according to the first example embodiment.

FIG. 6 is a diagram illustrating an example of the operation of the post-processing unit 11 according to the present example embodiment. Note that the unidirectional arrows in the figure simply indicate the relationship between the data, and do not preclude a bidirectional relationship between the data. In the example in FIG. 6, the post-processing unit 11 retrieves the following query from the query storage unit 13.

<link_prediction, {pred:"E1 is a big city", "E1": Kyoto}>

A query is represented by the combination of a symbol "link_prediction", which represents the content of the indication, and an associative array including the information necessary to execute the processing by the indication. The value "E1 is a big city." corresponding to the key pred in the associative array is a predicate, and the value Kyoto corresponding to the key "E1" in the associative array is an entity. The query indicates the content of processing of evaluating the score, which is the accuracy of the degree of existence of the atom<"E1 is a big city", {"E1": Kyoto}>, which is the combination of a predicate and an associative array {"E1": Kyoto} including an entity and its corresponding key "E1".

Then, in the example in FIG. 6, for the entity Kyoto that is related to the execution of the processing, the post-processing unit 11 retrieves the entity feature vector $e_{Kyoto}$, which is calculated for the entity by the entity vector calculation unit 15.

Subsequently, in the example in FIG. 6, the post-processing unit 11 executes processing indicated by the query. For this purpose, the post-processing unit 11 converts the predicate "E1 is a big city." into a vector sequence by replacing each word with a bag-of-words vector, which is then input to a recurrent neural network to convert it into a vector $r_{pred}$. Then, the post-processing unit 11 calculates the inner product value s between $e_{Kyoto}$ and $r_{pred}$ and outputs it as the result of the processing.

Figure 7:
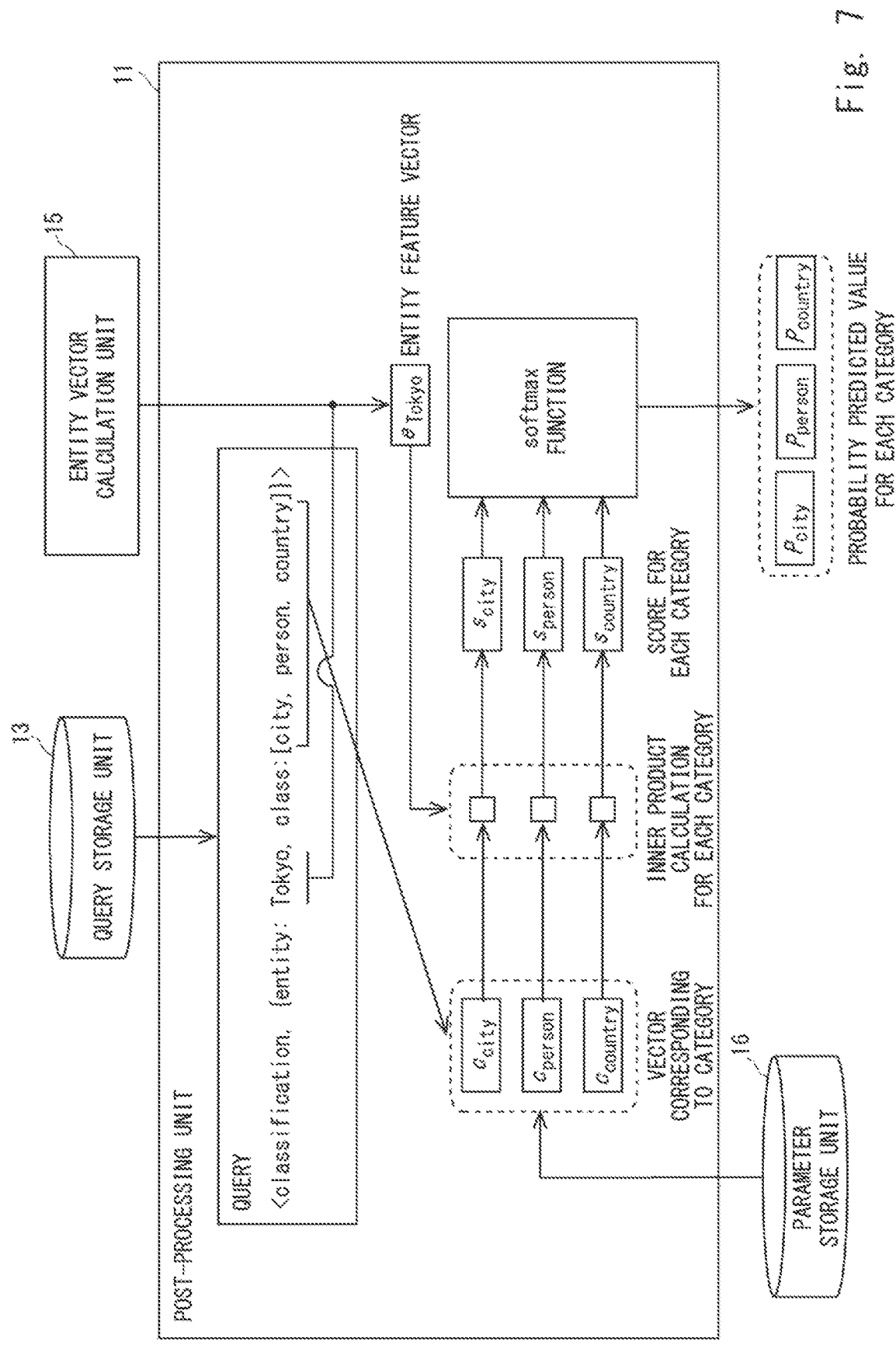
FIG. 7 is a diagram illustrating another example of the operation of the post-processing unit according to the first example embodiment.

FIG. 7 is a diagram illustrating another example of the operation of the post-processing unit 11 according to the present example embodiment. Note that the unidirectional arrows in the figure simply indicate the relationship between the data, and do not preclude a bidirectional relationship between the data. In the example in FIG. 7, the post-processing unit 11 retrieves the following query from the query storage unit 13.

<classification, {entity: Tokyo, class:[city, person, country]}>

The query is represented by the combination of a symbol "classification" which represents the content of the indication, and an associative array including the information necessary to execute the processing by the indication. The value corresponding to the key entity in the associative array is the entity Tokyo, and the value corresponding to the key class in the associative array is an array including the entity categories city, person, and country. The query indicates the content of processing in which the post-processing unit 11 outputs the predicted value of the probability that the entity Tokyo belongs to the category to each category belonging to the category array.

In the example in FIG. 7, for the entity Tokyo, the post-processing unit 11 retrieves the entity feature vector $e_{Tokyo}$, which is an entity feature vector calculated by the entity vector calculation unit 15.

Subsequently, in the example in FIG. 7, the post-processing unit 11 executes processing indicated by the query. For this purpose, the post-processing unit 11 retrieves the corresponding vectors $c_{city}$, $c_{person}$, and $c_{country}$ from the parameter storage unit 16 for each category belonging to the array of categories, and calculates $s_{city}$, $s_{person}$, and $s_{country}$, which are the inner product values with $e_{Tokyo}$, for each vector corresponding to these categories. Furthermore, the post-processing unit 11 applies the softmax function to the three calculated inner product values, calculates three values, $P_{city}$, $P_{person}$, and $P_{country}$, such that the sum is 1, and outputs them as predicted values of the probability that Tokyo belongs to the categories city, person, and country.

[Device Operation]

Figure 8:
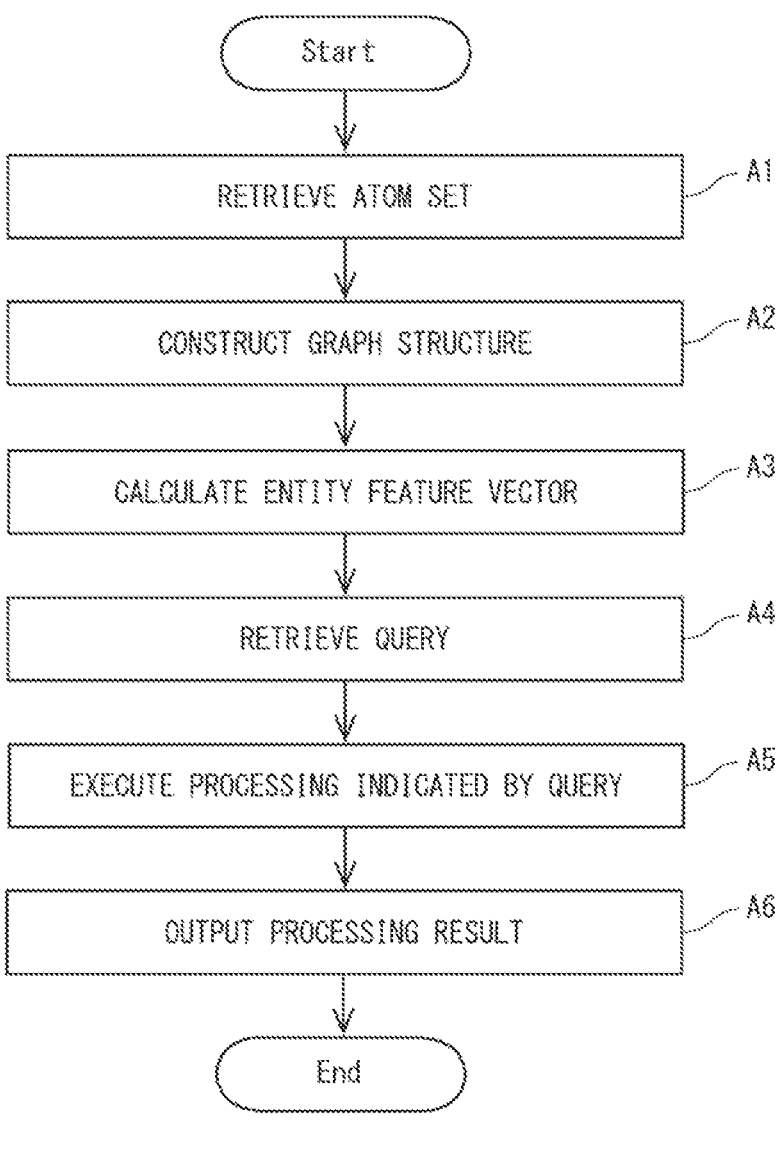
FIG. 8 is a flowchart illustrating the operation of the processing device according to the first example embodiment.

Next, the operation of the processing device 100 according to the first example embodiment will be described with reference to FIG. 8. FIG. 8 is a flowchart illustrating the operation of the processing device according to the first example embodiment. In the following description, FIGS. 1 to 7 will be referenced as appropriate. In the present first example embodiment, the processing method is performed by operating the processing device 100. Therefore, the description of the processing method in the present first example embodiment is replaced with the following description of the operation of the processing device 100.

As illustrated in FIG. 8, first, in a processing device, an atom set stored in the atom set storage unit 12 is retrieved (step A1).

Next, the graph structure extraction unit 14 constructs a graph structure from the atom set retrieved in step A1 that reflects information on the correspondence between argument keys and entities in the associative array for the atoms in the atom set, and outputs it (step A2). That is, a graph structure including information on the correspondence between keys and entities in the associative array is constructed using the set of atoms.

Next, the entity vector calculation unit 15 receives the graph structure constructed in step A2 as input, and calculates an entity feature vector for each of the entities including nodes corresponding to the graph structure (step A3). Step A3, as a part of its processing, may calculate an entity input vector, an atom input vector, and an edge input vector for each entity, atom, and edge in the graph structure. The entity input vector, atom input vector, and edge input vector may then be used as inputs to calculate the graph neural network output vector. In this manner, the graph structure may be received and the entity feature vectors may be calculated for each entity. In this manner, the processing method of the present example embodiment receives as input a set of atoms, which is the combination of a predicate and an associative array of entities that are arguments of the predicate, and calculates for each entity an entity feature vector that reflects the correspondence between keys and entities in the associative array.

Next, the query stored in the query storage unit 13 is retrieved (step A4).

Next, the post-processing unit 11 identifies the processing content indicated by the query retrieved in step A4 and executes the identified processing content using the entity feature vector calculated in step A3 (step A5). In this manner, the processing method of the present example embodiments receives a query indicating the content of processing and executes the processing indicated by the query using the entity feature vector.

Furthermore, the post-processing unit 11 outputs the result of the processing executed in step A5 (step A6).

Effects in First Example Embodiment

In the present first example embodiment, a graph structure is constructed from an atom set, reflecting information about the correspondence between argument keys and entities in the associative array of the atoms in the atom set. Then, based on the graph structure, an entity feature vector is calculated for each of the entities that appear in the atom set as arguments of the atom. The entity feature vector is then used to execute the processing indicated by a query. Therefore, according to the present first example embodiment, even when the entities in the arguments of the atom of the atom set have different roles, such roles are distinguished as keys in the associative array. This allows the computer to execute processing specific to each entity that reflects the different roles of the entities in the atom.

Furthermore, in the present first example embodiment, since parameters are not updated for calculating entity feature vectors, even when different atom sets are input, the same parameters can be used for each atom set to calculate consistent entity feature vectors for each atom set. Therefore, consistent processing can be executed for atom sets including different entities.

In contrast, the technique disclosed in Non Patent Literature 1 cannot allow a computer to execute processing that distinguishes between the roles of the entities in the arguments of the atoms of an atom set when they have different roles. For example, when the atom set illustrated in FIG. 4 is input, the technique disclosed in Non Patent Literature 1 does not distinguish the roles of the three entities Japan, Kyoto, and 794 that appear as arguments of the atom A3 from each other in order to calculate the vector to be used for post-processing. Since the entities Kyoto and 794 appear only in the atom A3 in the input atom set, the features that the entities Kyoto and 794 have in the atom set cannot be distinguished from each other when their roles in the atom A3 are not distinguished from each other. Therefore, different vectors cannot be calculated for the entities Kyoto and 794 and used for post-processing. Therefore, for example, when it is desired to output the category to which the entities belong in post-processing, it is not possible to appropriately output different categories such as place name and year number for Kyoto and 794.

On the other hand, according to the present first example embodiment, for example, as illustrated in FIG. 4, a graph structure can be extracted in which edges connected to entities Kyoto and 794 are given different labels, such as (isCapitalSince, city) and (isCapitalSince, year), respectively. Then, for example, the input vector calculation unit 17 can calculate different edge input vectors for these edges. In the combination of the graph structure and the input vectors, the entities Kyoto and 794 can be distinguished from each other by the edge input vector corresponding to their connecting edges. Therefore, for example, by inputting these graph structure and input vectors to the graph neural network calculation unit 18, different graph neural network output vectors can be calculated for the entities Kyoto and 794 and used as entity feature vectors. Therefore, for example, when classifying the categories to which the entities Kyoto and 794 belong in post-processing, it is possible to execute processing using different vectors for each entity. Therefore, for each entity, for example, different categories such as place name and year number can be appropriately output.

As described above, the present first example embodiment allows processing on the input atom set to be executed by an indication by query, reflecting the correspondence between argument keys and entities in the associative array of entities that are arguments of the atoms in the atom set. In addition, the processing can be executed without using the parameters associated with the entities that appear as the arguments of the atoms included in the atom set.

[Program]

The program in the present first example embodiment may be a program that causes a computer to execute steps A1 to A6 illustrated in FIG. 8. By installing and executing this program on a computer, the processing device 100 and the processing method in the present first example embodiment can be realized. In this case, the computer processor functions and executes processing as the graph structure extraction unit 14, entity vector calculation unit 15, input vector calculation unit 17, graph neural network calculation unit 18, and post-processing unit 11.

In the present first example embodiment, the atom set storage unit 12, query storage unit 13, and parameter storage unit 16 are realized by storing the data files constituting them in a storage device such as a hard disk provided in the computer. The atom set storage unit 12, query storage unit 13, and parameter storage unit 16 may be constructed on a computer different from the computer that executes the program in the present first example embodiment.

In addition, the program in the present first example embodiment may be executed by a computer system constructed by a plurality of computers. In this case, for example, each computer may function as any of the graph structure extraction unit 14, entity vector calculation unit 15, input vector calculation unit 17, graph neural network calculation unit 18, and post-processing unit 11.

Second Example Embodiment

Figure 9:
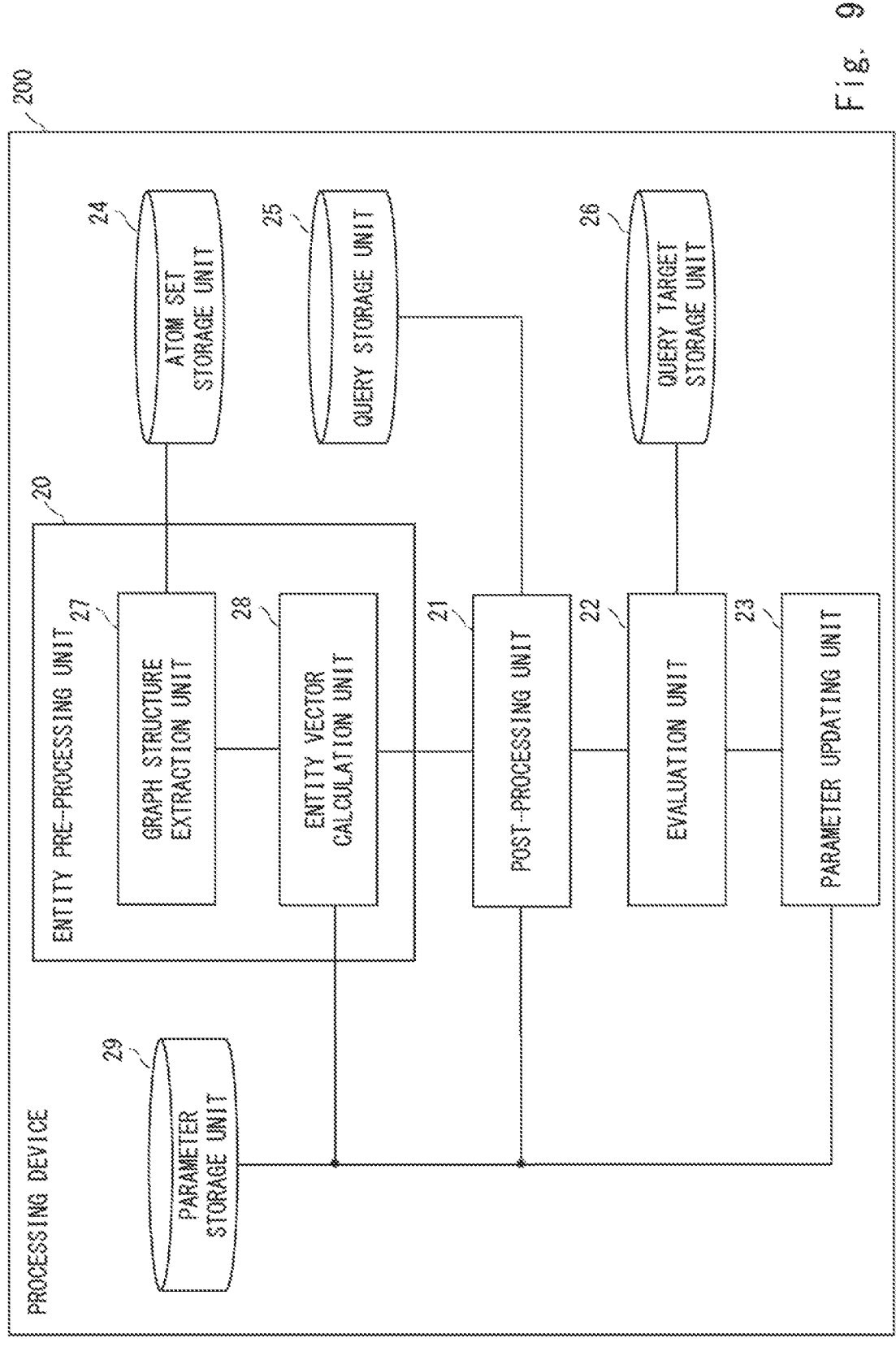
FIG. 9 is a block diagram illustrating the configuration of the processing device according to the second example embodiment.
Figure 10:
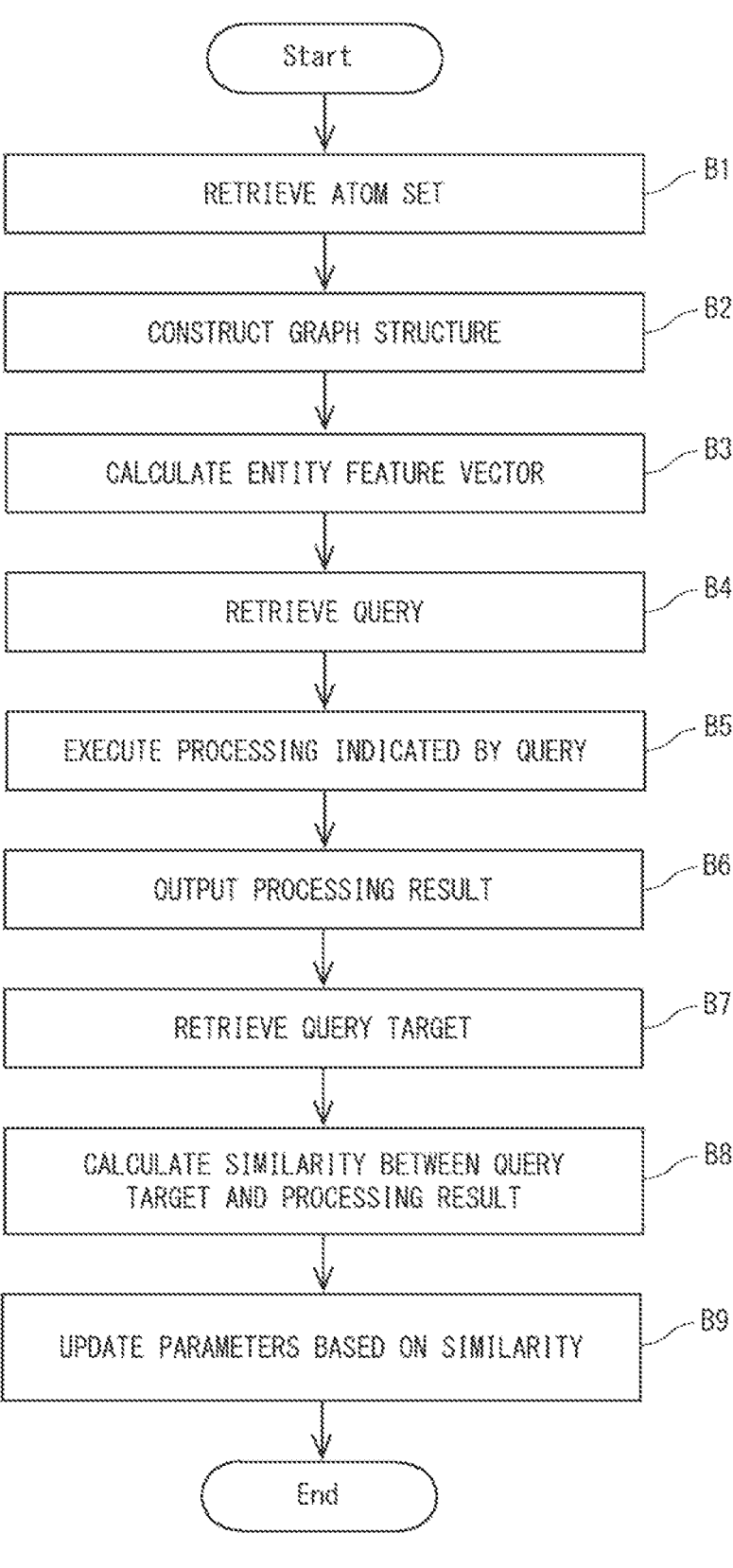
FIG. 10 is a flowchart illustrating the operation of the processing device according to the second example embodiment.

The following is a description of the processing device, processing method, and program according to the second example embodiment, with reference to FIGS. 9 and 10. [Device Configuration]

First, the configuration of the processing device according to the present second example embodiment will be described with reference to FIG. 9. FIG. 9 is a block diagram illustrating the configuration of the processing device according to the second example embodiment.

Similarly to the processing device in the first example embodiment, the processing device 200 in the present second example embodiment illustrated in FIG. 9 also receives an atom set as input and executes processing indicated by a query. Furthermore, after executing the processing, the processing device 200 evaluates the result of the processing and updates the parameters for executing the processing based on the similarity between the processing result and the query target, which is the desired processing result.

As illustrated in FIG. 9, the processing device 200 includes an entity pre processing unit 20, a post-processing unit 21, an evaluation unit 22, and a parameter updating unit 23. That is, the processing device 200 in the present second example embodiment partially includes the configuration of the processing device 100 in the first example embodiment. The entity pre-processing unit 20, post-processing unit 21, evaluation unit 22, and parameter updating unit 23 function as an entity pre-processing means, post-processing means, evaluation means, and parameter updating means, respectively.

As illustrated in FIG. 9, also in the present second example embodiment, the processing device 200 includes an atom set storage unit 24, a query storage unit 25, and a parameter storage unit 29. The atom set storage unit 24, query storage unit 25, and parameter storage unit 29 function as an atom set storage means, a query storage means, and a parameter storage means, respectively. Also in the present second example embodiment, the entity pre-processing unit 20 includes a graph structure extraction unit 27 and an entity vector calculation unit 28 inside. The graph structure extraction unit 27 and entity vector calculation unit 28 function as a graph structure extraction means and entity vector calculation means, respectively. As in the first example embodiment, the parameter storage unit 29 stores the parameters used by the entity vector calculation unit 28 and the parameters used by the post-processing unit 21.

Furthermore, as illustrated in FIG. 9, in the present second example embodiment, the processing device 200 includes a query target storage unit 26. The query target storage unit 26 functions as a query target storage means.

As in the first example embodiment, the graph structure extraction unit 27 extracts a graph structure from the atom set stored in the atom set storage unit 24.

As in the first example embodiment, the entity vector calculation unit 28 calculates an entity feature vector for each of the entities in the graph structure.

Similarly to the first example embodiment, the post-processing unit 21 reads a query from query storage unit 25, executes the processing indicated by the query using the entity feature vector, and outputs the processing result.

In the present example embodiment, the evaluation unit 22 retrieves the query target corresponding to the query from the query target storage unit 26. The query target represents the desired processing result as a result of the processing indicated by the corresponding query.

Subsequently, in the present example embodiment, the evaluation unit 22 compares the processing result output from the post-processing unit 21 with the query target retrieved from the query target storage unit 26, and outputs the similarity between the processing result and the query target. In order to calculate the similarity, for example, indicators such as how small the distance between the processing result and the query target may be used as the similarity. For example, the smaller the distance, the greater the similarity. In this manner, the evaluation unit 22 compares the processing result output by the post-processing unit 21 with the query target, which is the desired processing result, and calculates the similarity between the processing result output by the post-processing unit 21 and the query target.

The parameter updating unit 23 updates the parameters used in the processing device 200 based on the similarity between the processing result output by the post-processing unit 21 and the query target. For example, the parameter updating unit 23 updates the parameters stored in the parameter storage unit 29 using the gradient method so that the similarity output from the evaluation unit 22 increases. [Device Operation]

Next, the operation of the processing device 200 in the second example embodiment will be described with reference to FIG. 10. FIG. 10 is a flowchart illustrating the operation of the processing device according to the second example embodiment. In the following description, FIG. 9 will be referenced as appropriate. In the present second example embodiment, the processing method is performed by operating the processing device 200. Therefore, the description of the processing method in the present second example embodiment is replaced with the following description of the operation of the processing device 200.

As illustrated in FIG. 10, first, in the processing device 200, an atom set stored in an atom set storage unit is retrieved (step B1).

Next, the graph structure extraction unit 27 constructs a graph structure from the atom set retrieved in step B1 that reflects information on the correspondence between argument keys and entities in the associative array for the atom in the atom set, and outputs it (step B2).

Next, the entity vector calculation unit 28 receives as input the graph structure constructed in step B2 and calculates an entity feature vector for each of the entities including nodes corresponding to the graph structure (step B3).

Next, the query stored in the query storage unit 25 is retrieved (step B4).

Next, the post-processing unit 21 identifies the processing content indicated by the query retrieved in step B4 and executes the identified processing content using the entity feature vector calculated in step B3 (step B5).

Furthermore, the post-processing unit 21 outputs the result of the processing executed in step B5 (step B6).

Next, in the processing device 200, the query target stored in the query target storage unit 26 is retrieved (step B7).

Next, the similarity between the processing result output in step B6, the query target retrieved in step B7, and the processing result is calculated (step B8). That is, the processing results up to step B6 are compared with the query target, which is the desired processing result, and the similarity between the processing results up to step B6 and the query target is calculated.

Next, the parameters stored in the parameter storage unit are updated based on the similarity calculated in step B8 (step B9). Specifically, the parameters used in the processing up to step B6 are updated to increase the similarity between the processing results up to step B6 and the query target.

Effects in Second Example Embodiment

In the second example embodiment, as in the first example embodiment, the processing indicated by the query extracted from the query storage unit 25 is executed using the atom set extracted from the atom set storage unit 24. Therefore, in the present second example embodiment, effects similar to the effects in the first example embodiment are exhibited.

Furthermore, in the present second example embodiment, the similarity between the processing result and the query target, which is the desired processing result, is calculated from the result of the processing in the post-processing unit 21 and the query target retrieved from the query target storage unit 26. Then, the parameters stored in the parameter storage unit 29 are updated based on the similarity. Therefore, it is possible to output a result close to a desired processing result given as a query target without manually setting or adjusting parameters used in the entity vector calculation unit 28 and post-processing unit 21 in advance.

Furthermore, the parameters can be learned such that the result of the processing is close to the desired result given as the query target. It can be useful in various fields that require prediction or processing according to an atom set and one or more entities that appear as arguments for atoms in the atom set, for example, knowledge base completion or hypothetical reasoning.

[Program]

The program in the present second example embodiment may be a program that causes a computer to execute steps B1 to B9 illustrated in FIG. 10. By installing and executing this program on a computer, the processing device 200 and the processing method in the present second example embodiment can be realized. In this case, the computer processing device functions and executes processing as the graph structure extraction unit 27, entity vector calculation unit 28, post-processing unit 21, evaluation unit 22, and parameter updating unit 23.

In the present second example embodiment, the atom set storage unit 24, query storage unit 25, query target storage unit 26, and parameter storage unit 29 are realized by storing the data files constituting them in a storage device such as a hard disk provided in the computer. The atom set storage unit 24, query storage unit 25, query target storage unit 26, and parameter storage unit 29 may be constructed on a computer different from the computer that executes the program in the present second example embodiment.

In addition, the program in the present second example embodiment may be executed by a computer system constructed by a plurality of computers. In this case, for example, each computer may function as the graph structure extraction unit 27, entity vector calculation unit 28, post-processing unit 21, evaluation unit 22, and parameter updating unit 23, respectively.

(Physical Configuration)

Figure 11:
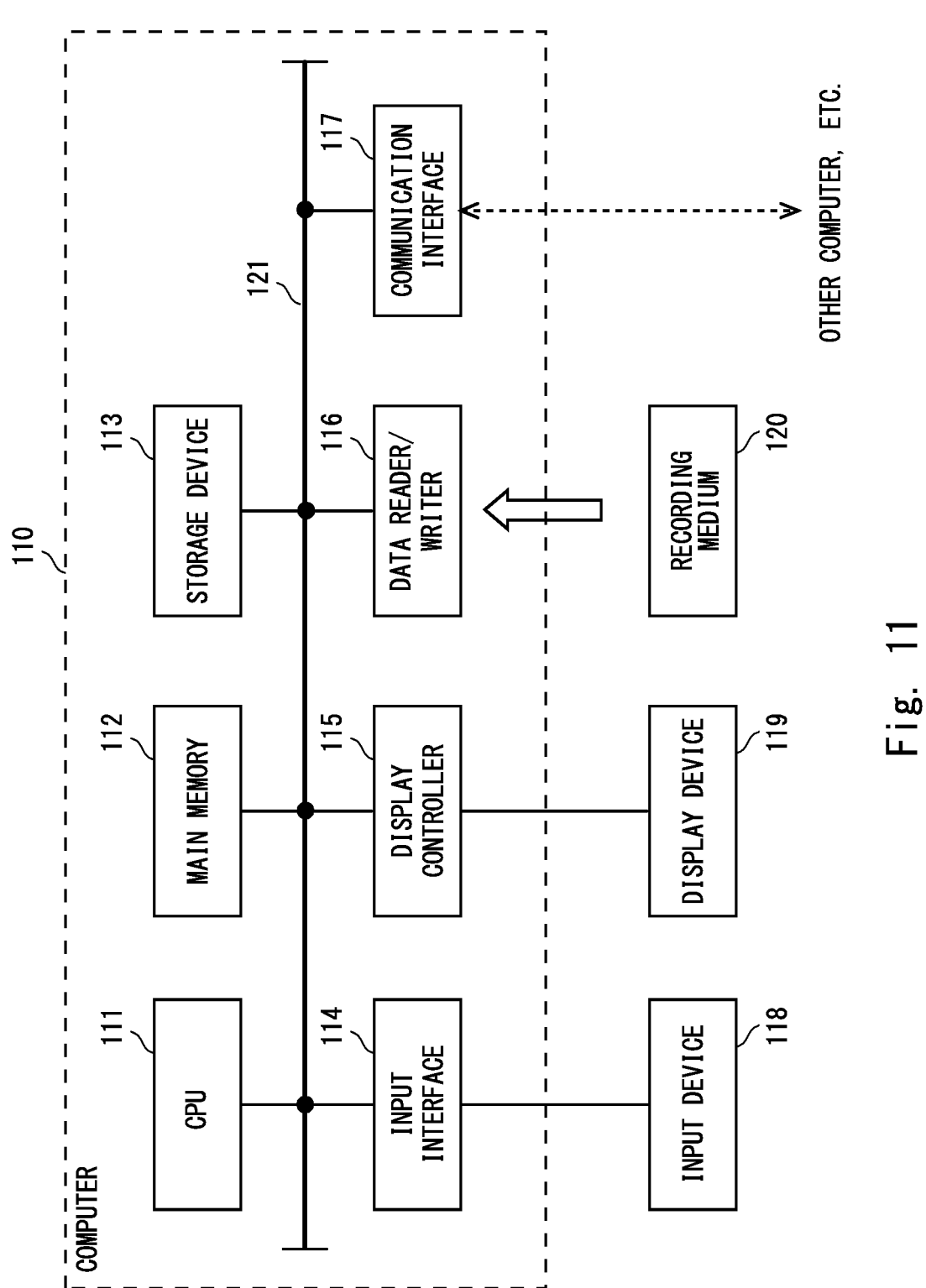
FIG. 11 is a diagram illustrating an example of the computer that realizes the processing device according to the first and second example embodiments.

Here, the physical configuration of the computer that realizes the processing device by executing the programs in the first and second example embodiments is described using FIG. 11. FIG. 11 is a block diagram illustrating an example of the computer that realizes the processing device according to the first and second example embodiments.

As illustrated in FIG. 11, a computer 110 includes a central processing unit (CPU) 111, a main memory 112, a storage device 113, an input interface 114, a display controller 115, a data reader/writer 116, and a communication interface 117. These units are data-communicably connected to each other via a bus 121. Furthermore, the computer 110 may include a graphics processing unit (GPU) or a field-programmable gate array (FPGA) in addition to or instead of the CPU 111.

The CPU 111 expands the programs (codes) in the present example embodiment stored in the storage device 113 in the main memory 112, and executes these in a predetermined order to execute various operations. The main memory 112 is typically a volatile storage device such as a dynamic random access memory (DRAM). The program according to the present example embodiment is provided in a state of being stored in a computer readable recording medium 120. The program in the present example embodiment may be distributed over the Internet connected via the communication interface 117.

Specific examples of the storage device 113 include semiconductor storage devices such as flash memory as well as hard disk drives. The input interface 114 mediates data transmission between the CPU 111 and the input device 118 such as a keyboard and a mouse. The display controller 115 is connected to the display device 119 and controls display on the display device 119.

The data reader/writer 116 mediates data transmission between the CPU 111 and recording medium 120, and reads programs from the recording medium 120 and writes the results of processing in the computer 110 to the recording medium 120. The communication interface 117 mediates data transmission between the CPU 111 and the other computer.

Specific examples of the recording medium 120 include general-purpose semiconductor storage devices such as CF (Compact Flash (registered trademark)) and SD (Secure Digital), magnetic recording media such as flexible disks, and optical recording media such as CD-ROM (Compact Disk Read Only Memory).

The processing device in the present example embodiment can be realized not by a computer with a program installed, but by using hardware corresponding to each unit. Furthermore, the processing device may be realized partly in program and the rest in hardware.

Although the present invention has been described above with reference to the first and second example embodiments, the present invention is not limited to the above first and second example embodiments. Various modifications that can be understood by those skilled in the art can be made to the configuration and details of the present invention within the scope of the present invention. For example, an example embodiment combining the respective configurations of the first and second example embodiments is also included in the scope of the technical concept.

Some or all of the above example embodiments may be described as the following supplementary notes, but are not limited to the following.

Supplementary Note 1

A processing device including:

an entity pre-processing means for receiving as input a set of atoms, which is a combination of a predicate and an associative array of entities that are arguments of the predicate, and calculating for each of the entities an entity feature vector that reflects a correspondence between keys and the entities in the associative array; and a post-processing means for receiving a query indicating contents of processing and executing the processing indicated by the query using the entity feature vector.

Supplementary Note 2

The processing device according to Supplementary note 1, in which the entity pre-processing means includes:

a graph structure extraction means for receiving as input the set of the atoms and constructing a graph structure including information on the correspondence between keys and the entities in the associative array; and an entity vector calculation means for receiving the graph structure and calculating the entity feature vector for each of the entities.

Supplementary Note 3

The processing device according to Supplementary note 2, in which the entity vector calculation means includes:

an input vector calculation means for calculating an entity input vector, an atom input vector, and an edge input vector for each of the entities, the atoms, and edges included in the graph structure; and a graph neural network calculation means for receiving as input the entity input vector, the atom input vector, and the edge input vector and calculating a graph neural network output vector.

Supplementary Note 4

The processing device according to any one of Supplementary notes 1 to 3, further including:

an evaluation means for comparing a processing result output by the post-processing means with a query target, which is a desired processing result, and calculating a similarity between the processing result output by the post-processing means and the query target; and a parameter updating means for updating parameters based on the similarity.

Supplementary Note 5

A processing method including:

(a) receiving as input a set of atoms, which is a combination of a predicate and an associative array of entities that are arguments of the predicate, and calculating for each of the entities an entity feature vector that reflects a correspondence between keys and the entities in the associative array; and (b) receiving a query indicating contents of processing, and executing processing indicated by the query using the entity feature vector.

Supplementary Note 6

The processing method according to Supplementary note 5, in which the (a) includes, as a part of the processing:

(a1) receiving as input the set of the atoms and constructing a graph structure including information on the correspondence between keys and the entities in the associative array; and (a2) receiving the graph structure and calculating the entity feature vector for each of the entities.

Supplementary Note 7

The processing method according to Supplementary note 6, in which the (a2) includes, as a part of the processing:

calculating an entity input vector, an atom input vector, and an edge input vector for each of the entities, the atoms, and edges included in the graph structure; and receiving as input the entity input vector, the atom input vector, and the edge input vector, and calculating a graph neural network output vector.

Supplementary note 8

The processing method according to any one of Supplementary notes 5 to 7, further including, after the (b):

(c) comparing a processing result of the (b) with a query target, which is a desired processing result, and calculating a similarity between the processing result of the (b) and the query target; and (d) updating the parameters used in the processing in the (b) based on the similarity.

Supplementary Note 9

A non-transitory computer readable medium storing a program causing a computer to execute:

(a) receiving as input a set of atoms, which is a combination of a predicate and an associative array of entities that are arguments of the predicate, and calculating for each of the entities an entity feature vector that reflects a correspondence between keys and the entities in the associative array; and (b) receiving a query indicating contents of processing, and executing processing indicated by the query using the entity feature vector.

Supplementary Note 10

The non-transitory computer readable medium storing a program according to Supplementary note 9, further causing a computer, as a part of the processing in the (a), to execute:

(a1) receiving as input the set of the atoms and constructing a graph structure including information on the correspondence between keys and the entities in the associative array; and (a2) receiving the graph structure and calculating the entity feature vector for each of the entities.

Supplementary Note 11

The non-transitory computer readable medium storing a program according to Supplementary note 10, further causing a computer to execute, as a part of the processing in the (a2):

calculating an entity input vector, an atom input vector, and an edge input vector for each of the entities, the atoms, and edges included in the graph structure; and receiving as input the entity input vector, the atom input vector, and the edge input vector, and calculating a graph neural network output vector.

Supplementary note 12

The non-transitory computer readable medium storing a program according to any one of Supplementary notes 9 to 11, further causing a computer to execute after the (b):
    (c) comparing a processing result of the (b) with a query target, which is a desired processing result, and calculating a similarity between the processing result of the (b) and the query target; and
    (d) updating the parameters used in the processing in the (b) based on the similarity.

REFERENCE SIGNS LIST

10 ENTITY PRE-PROCESSING UNIT
11 POST-PROCESSING UNIT
12 ATOM SET STORAGE UNIT
13 QUERY STORAGE UNIT
14 GRAPH STRUCTURE EXTRACTION UNIT
15 ENTITY VECTOR CALCULATION UNIT
16 PARAMETER STORAGE UNIT
17 INPUT VECTOR CALCULATION UNIT
18 GRAPH NEURAL NETWORK CALCULATION UNIT
20 ENTITY PRE-PROCESSING UNIT
21 POST-PROCESSING UNIT
22 EVALUATION UNIT
23 PARAMETER UPDATING UNIT
24 ATOM SET STORAGE UNIT
25 QUERY STORAGE UNIT
26 QUERY TARGET STORAGE UNIT
27 GRAPH STRUCTURE EXTRACTION UNIT
28 ENTITY VECTOR CALCULATION UNIT
29 PARAMETER STORAGE UNIT
100 PROCESSING DEVICE
110 COMPUTER
111 CPU
112 MAIN MEMORY
113 STORAGE DEVICE
114 INPUT INTERFACE
115 DISPLAY CONTROLLER
116 DATA READER/WRITER
117 COMMUNICATION INTERFACE
118 INPUT DEVICE
119 DISPLAY DEVICE
120 RECORDING MEDIUM
121 BUS
200 PROCESSING DEVICE

What is claimed is:

1. A processing device comprising:
an entity pre-processing unit configured to receive a set of atoms, the atom indicating a combination of a predicate and an associative array of entities that are arguments of the predicate, and to calculate an entity feature vector for each of the entities, the vector reflecting a correspondence between key and the entity in the associative array; and
a post-processing unit configured to receive a query indicating contents of processing and executing the processing indicated by the query using the entity feature vector.

2. The processing device according to claim 1, wherein the entity pre-processing unit comprises:
a graph structure extraction unit configured to receive the set of the atoms and constructing a graph structure comprising information on the correspondence between key and the entity in the associative array; and an entity vector calculation unit configured to receive the graph structure and to calculate the entity feature vector for each of the entities.

3. The processing device according to claim 2, wherein the entity vector calculation unit comprises:
an input vector calculation unit configured to calculate an entity input, vector of each of the entities, an atom input vector of each of the atoms, and an edge input vector of each of edges included in the graph structure; and
a graph neural network calculation unit configured to receive the entity input vector, the atom input vector, and the edge input vector and calculating an output vector by using a graph neural network model.

4. The processing device according to claim 1, further comprising:
a calculation unit configured to compare a processing result output by the post-processing unit with a query target, which is a desired processing result, and to calculate a similarity between the processing result output by the post-processing unit and the query target; and
a parameter updating unit configured to update parameters based on the similarity.

5. A processing method comprising:
(a) receiving a set of atoms, the atom indicating a combination of a predicate and an associative array of entities that are arguments of the predicate, and calculating an entity feature vector for each of the entities, the vector reflecting a correspondence between key and the entity in the associative array; and
(b) receiving a query indicating contents of processing, and executing processing indicated by the query using the entity feature vector.

6. The processing method according to claim 5, wherein the (a) comprises, as a part of the processing:
(a1) receiving the set of the atoms and constructing a graph structure comprising information on the correspondence between key and the entity in the associative array; and
(a2) receiving the graph structure and calculating the entity feature vector for each of the entities.

7. The processing method according to claim 6, wherein the (a2) comprises, as a part of the processing:
calculating an entity input vector of each of the entities, an atom input vector of each of the atoms, and an edge input vector of each of edges included in the graph structure; and
receiving the entity input vector, the atom input vector, and the edge input vector, and calculating an output vector by using a graph neural network model.

8. The processing method according to claim 5, further comprising, after the (b):
(c) comparing a processing result of the (b) with a query target, which is a desired processing result, and calculating a similarity between the processing result of the (b) and the query target; and
(d) updating the parameters used in the processing in the (b) based on the similarity.

9. A non-transitory computer readable medium storing a program causing a computer to execute:
(a) receiving as input a set of atoms, the atom indicating a combination of a predicate and an associative array of entities that are arguments of the predicate, and calculating an entity feature vector for each of the entities, the vector reflecting a correspondence between key and the entity in the associative array; and (b) receiving a query indicating contents of processing, and executing processing indicated by the query using the entity feature vector.

10. The non-transitory computer readable medium storing a program according to claim 9, further causing a computer, as a part of the processing in the (a), to execute:

(a1) receiving the set of the atoms and constructing a graph structure including information on the correspondence between key and the entity in the associative array; and (a2) receiving the graph structure and calculating the entity feature vector for each of the entities.

11. The non-transitory computer readable medium storing a program according to claim 10, further causing a computer to execute, as a part of the processing in the (a2):

calculating an entity input vector of each of the entities, an atom input vector of each of the atoms, and an edge input vector of each of edges included in the graph structure; and receiving as input the entity input vector, the atom input vector, and the edge input vector, and calculating an output vector by using a graph neural network model.

12. The non-transitory computer readable medium storing a program according to claim 9, further causing a computer to execute after the (b):

(c) comparing a processing result of the (b) with a query target, which is a desired processing result, and calculating a similarity between the processing result of the (b) and the query target; and (d) updating the parameters used in the processing in the (b) based on the similarity.

<div align="center">*   *   *   *   *</div>